(12) United States Patent
Sutton

(10) Patent No.: US 11,810,346 B2
(45) Date of Patent: Nov. 7, 2023

(54) LAND USE FOR TARGET PRIORITIZATION

(71) Applicant: Goodrich Corporation, Charlotte, NC (US)

(72) Inventor: Alexander Charles Sutton, Lowell, MA (US)

(73) Assignee: Goodrich Corporation, Charlotte, NC (US)

( * ) Notice: Subject to any disclaimer, the term of this patent is extended or adjusted under 35 U.S.C. 154(b) by 145 days.

(21) Appl. No.: 17/341,169

(22) Filed: Jun. 7, 2021

(65) Prior Publication Data

US 2022/0391610 A1   Dec. 8, 2022

(51) Int. Cl.
*G06T 7/10* (2017.01)
*G06V 20/13* (2022.01)
*G06V 10/25* (2022.01)
*G06V 10/22* (2022.01)

(52) U.S. Cl.
CPC ............. *G06V 20/13* (2022.01); *G06V 10/22* (2022.01); *G06V 10/25* (2022.01)

(58) Field of Classification Search
CPC ......... G06V 20/13; G06V 10/22; G06V 10/25
See application file for complete search history.

(56) References Cited

U.S. PATENT DOCUMENTS

| | | | | |
|---|---|---|---|---|
| 6,347,762 B1* | 2/2002 | Sims | ...................... | F41G 7/2293 244/3.17 |
| 8,229,163 B2* | 7/2012 | Coleman | ................. | G06V 20/13 382/103 |
| 8,958,603 B2* | 2/2015 | Boriah | ................... | G06V 20/13 382/109 |
| 9,609,619 B2 | 3/2017 | Woodcock, IV | | |
| 10,891,483 B2* | 1/2021 | Yang | ................... | G06V 10/774 |
| 2015/0206014 A1* | 7/2015 | Wu | ........................ | H04N 7/183 348/149 |
| 2017/0328716 A1* | 11/2017 | Ma | .......................... | G06V 20/17 |
| 2019/0346269 A1* | 11/2019 | Mohr | ..................... | G06T 17/05 |
| 2020/0208970 A1* | 7/2020 | Zhu | ........................ | G08G 5/045 |
| 2020/0208978 A1 | 7/2020 | Dicander | | |
| 2021/0166020 A1 | 6/2021 | Li et al. | | |
| 2022/0137634 A1* | 5/2022 | Bozchalooi | .......... | G05D 1/0212 701/59 |

FOREIGN PATENT DOCUMENTS

| | | | |
|---|---|---|---|
| CN | 108053406 B | 5/2021 | |
| WO | WO-2020010620 A1 * | 1/2020 | .......... B64C 39/024 |

OTHER PUBLICATIONS

Lofy B. et al., "Segmenting Multisensor Aerial Images in Class-Scale Space", Pattern Recognition, vol. 34, No. 9, Sep. 1, 2001, pp. 1825-1839.

Extended European Search Report dated Nov. 3, 2022, issued during the prosecution of European Patent Application No. EP 22177483.9.

* cited by examiner

*Primary Examiner* — Emily C Terrell
*Assistant Examiner* — Ahmed A Nasher
(74) *Attorney, Agent, or Firm* — Locke Lord LLP; Joshua L. Jones; Gabrielle L. Gelozin

(57) ABSTRACT

An imaging system comprises an imaging platform, a camera operatively connected to the imaging platform, and a controller operatively connected to control the imaging platform and the camera. The controller includes machine readable instructions configured to cause the controller to perform a method.

18 Claims, 3 Drawing Sheets

LAND USE FOR TARGET PRIORITIZATION

BACKGROUND

1. Field

The present disclosure relates generally to imaging, image processing, and image analysis, and more particularly to imaging, image processing, and image analysis for ground-looking images from aerospace imaging platforms.

2. Description of Related Art

Searching a wide area for rare targets presents a challenging use case for high-altitude surveillance and reconnaissance. The area to be explored can be many times greater than the platforms and imaging systems can assess in real time.

The conventional techniques have been considered satisfactory for their intended purpose. However, there is an ever present need for improved systems and methods for Image processing and analysis. This disclosure provides a solution for this need.

SUMMARY

An imaging system comprises an imaging platform, a camera operatively connected to the imaging platform, and a controller operatively connected to control the imaging platform and the camera. The controller includes machine readable instructions configured to cause the controller to perform a method.

In certain embodiments, the method includes, obtaining downward looking images of an area, determining land types indicated in the images, screening the images based on the land types where screened images pass screening based on land type more likely to include a target, analyzing only portions the screened images that include one or more land types likely to include the target, and foregoing analysis of other portions of the images, identifying the target in one of the images. In certain embodiments, the land types include dry ground and bodies of water. In certain embodiments, the method can further include directing a physical asset to move physically toward the target.

In certain embodiments, identifying the target includes identifying multiple instances of one type of target in one or more of the images. In certain embodiments, identifying includes providing output to a user showing identity and/or location of the target.

In certain embodiments, screening includes for each image, grouping pixels of like-land types into groups, one group for each land type in the image. In certain embodiments, grouping pixels of like-land types can include grouping pixels by identical land type. In certain embodiments, grouping pixels of like-land types can include grouping pixels in hierarchical land types. In embodiments, screening includes using a look up table identifying likelihood of finding a target in each land type in the images.

In embodiments, the method can further include only analyzing images in the area that are within a region of interest (ROI) In certain embodiments, the method can further include dividing the image into a grid of sub-images, determining a weight for each sub-image in a region of interest based on a land-target score, a distance traveled, and a turn penalty, and directing a physical resource to move toward one or more instances of the target if the weight of one or more instances of the target is above a threshold. In certain embodiments, the physical resource is an imaging platform and obtaining the downward looking images of the area is performed by the imaging platform.

In certain embodiments, analyzing includes: dividing an image into a grid of sub-images, and for each sub-image, summing a product of each type of land and its size within the sub-image to obtain a score, the score being representative of a likelihood of finding a target in each land type in the images, sorting the sub-images into a queue by score, and analyzing the sub-images to identify instances of a target, wherein analyzing is performed in order starting with a sub-image of highest score in the queue down to sub-images with lowest score. In certain such embodiments, sorting new imagery into the queue and analyzing some of the new imagery before completing analysis of all original sub-images in the queue.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
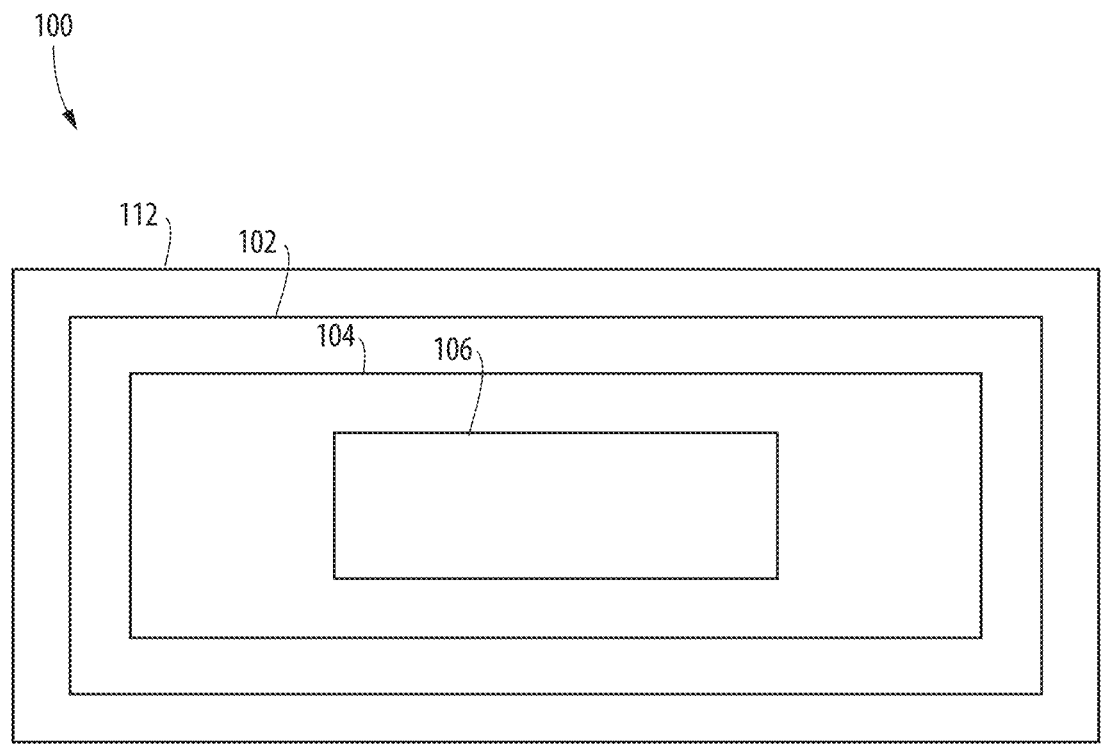
FIG. 1 is a schematic perspective view of an embodiment of a system constructed in accordance with the present disclosure, showing the imaging platform and the controller.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to improve image processing, e.g., aboard airborne imaging platforms.

Searching a wide area for rare targets presents a challenging use case for high-altitude surveillance and reconnaissance, for example because area to be explored can be many times greater than the platforms and imaging systems can assess and can assess in real time. Performing image capture based on classified land types provides an opportunity to decrease the search space by focusing imaging on areas where targets are more commonly found (e.g. determined regions of interest (ROI)).

Focused imaging can be particularly useful in mission planning, for example, having an operator pre-select an ROI to search for a target of interest, prioritizing areas where targets are most likely to be found. In addition to mission planning, land use types can also be exploited for prioritizing which images to process first during a collection, for example screening incoming data (imagery) to prioritize areas where targets are most likely to be found in the captured images. Mission planning and image prioritization are a few non limiting examples of applications for such technology, and do not represent an exhaustive list of applications for a system (e.g. system 100) using the imaging methods described herein.

An imaging system 100 for focused image capture and image prioritization comprises an imaging platform 102 (e.g. a piloted aircraft, drone, satellite, or the like), a camera 104 operatively connected to the imaging platform 102, and a controller 106 operatively connected to control the imaging platform 102 and the camera 104. The controller 106 includes machine readable instructions configured to cause the controller 106 to perform at least one method. A first method including prioritizing land types for image capture, and a second method for prioritizing captured images for analysis.

Figure 2:
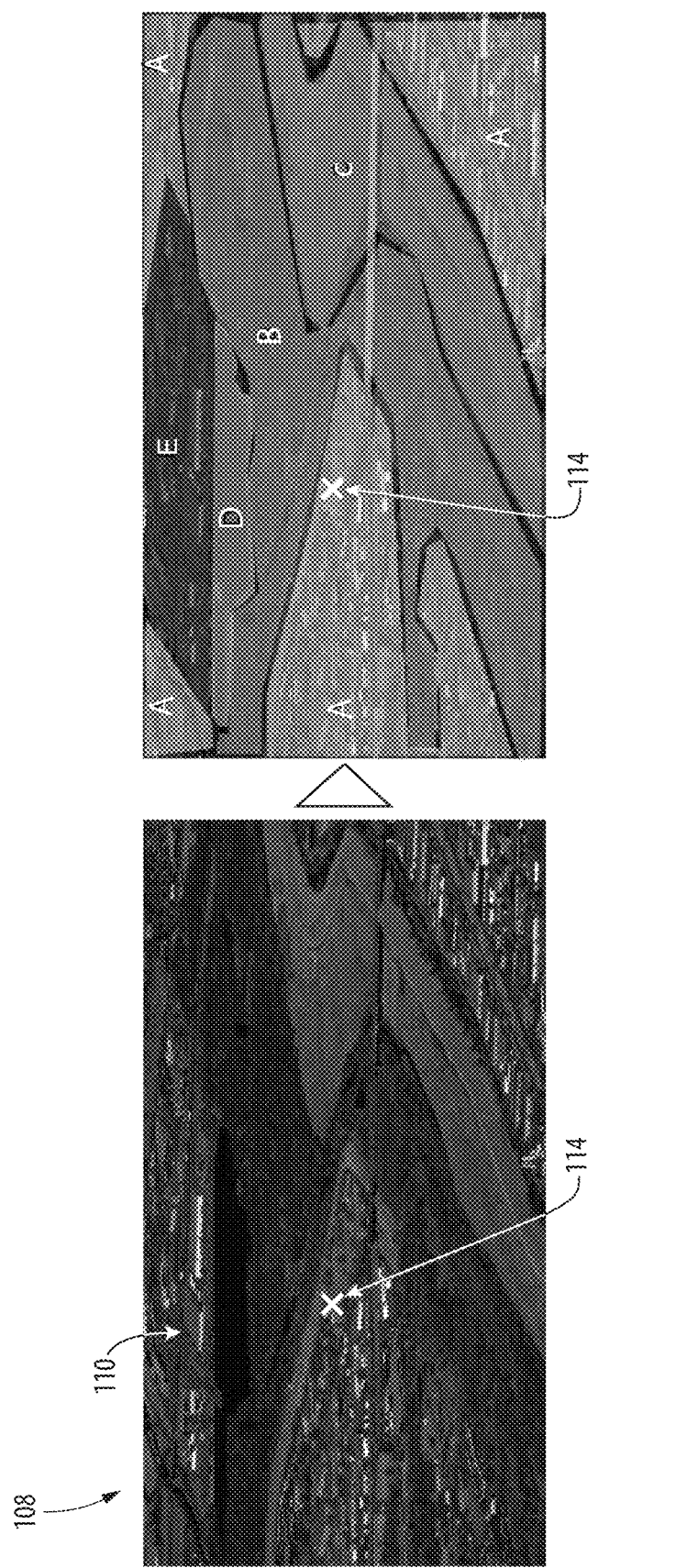
FIG. 2 is a schematic diagram of an image divided into land types in accordance with the present disclosure.

As shown in FIG. 2, the imaging platform obtains downward looking images 108 of an area 110 and determining land types A, B, C, D indicated in the images. Land types as described herein can be any surface captured and recognized by the camera, including dry ground and bodies of water. Prior to a mission, land maps can be created in any suitable manner (e.g. using multispectral imaging or satellite imaging) to define and classify known land types. The existing land maps provide a priori information about the specific land type such that the controller 106 can exploit the a priori known land types and determine where those land types are located in an image by coordinate between the location of the imaging platform when an image is obtained, the direction (camera pose) in which the image was obtained relative to the imaging platform, and what land types from the existing land maps is in view in the image.

Once the image 108 is captured, the land types are mapped onto the image 108, dividing the image into areas of the various land types. Next, the method includes screening the images 108 based on the land types. An image 108 will pass screening if the land type is determined to be more likely to include a desired target. As described herein, a target is a type of target, for example a type of land vehicle. In certain instances for example, the target can be a certain type of land vehicle when searching for any number of such land vehicles in the captured images 108.

Screening includes, for each image 108, grouping pixels of like-land types into groups, one group for each land type in the image. Grouping pixels of like-land types can include grouping pixels by identical land type, or can include grouping pixels in hierarchical land types (e.g. grouping all forest versus coniferous, dense, new growth, and the like).

More specifically, screening includes using a look up table identifying likelihood of finding a target in each land type in the images. The look up table can be generated in at least the manner described below, however, any suitable manner for generating a look up table is contemplated herein. For example, $x_i \in X$, $x_i=(x_i^{lon}, x_i^{lat}, x_i^{target})$, where X is a list of a priori detections.

It is possible to tailor target lookup table (B) to each theater of operation to dynamically assess how targets 114 are deployed differently, or when new targets or target variants are observed. A count of target 114 in a given land type can be determined using, $L: X \to \hat{B}$, $\hat{b}_{target,land} \in \hat{B}$, $\hat{b}_{target,land} = (c)$, where L is the lookup that maps lon/lat (X) to land types ($\hat{B}$) and $\hat{B}$ is a matrix where row is target type and column is land type, and value is the count (c) of targets found on that land type. $\hat{B}$ is easily converted to B, a row-stochastic matrix, by $b_{i,j}=b_{i,j}/\Sigma_j b_{i,j}$ meaning each target row sums to 1. B is then mapped back to the physical space A by $L^{-1}: B \to A$, where A has 2 spatial dimensions (lon, lat)=$(j_x, j_y)$ and a channel dimension whose size is the number of targets. $a_{i_{j,j}} \in A$ and summing over all target channels ($\Sigma_i a_{i_{j,j}}$) provides the utility of $j_x, j_y$. Since $\Sigma_i a_{i_{j,j}} \in \mathbb{R}^2$, just like the original input X, it can be easily leveraged for uses cases (e.g. as discussed below). Summing over targets provides a 2-D (lon-lat) object such that A can be dynamically discretized to reduce the footprint of the representation, e.g. if 2×2 pixels are the same land type, they can be combined into a single pixel.

The method next includes further analyzing the images 108, where only the portions of the screened images which include the land types likely to include the target 114 are analyzed. For portions of the image 108 which are of other land types, analysis can be foregone, decreasing processing time for the image 108. If the image is determined to have a land type likely to include the target 114, the controller can then identify the target 114 in the image 108, either singly, or identify multiple instances of one type of target in one or more of the images. For example, analyzing the image 108 can be done by creating a discretized map spanning the ROI (e.g. the land type in which the target 114 is detected, or likely to be detected—land type A in this example), with a channel for each target class where channel values are populated using the lookup ($L^{-1}$) that generated $L: X \to B$. Solving Equation 1 for some objective function will optimize the mission plan: $a_{i,j} \in A$, $j \in \{lon, lat\}$, $i \in \{targets\}$ where j has 2 spatial dimensions but can be flattened for simplicity.

In embodiments, the mission planning method can further include only capturing imagery 108 in the area that are within the ROI while disregarding or discarding portions of the images outside of the ROI, so that the method is performed only on those portions within the ROI. For example, the method can further include determining a weight for the priority of each type of target 114 identified with respect to a land-target score, a distance traveled, and a turn penalty, where distance travelled and turn penalty relate to the physical distance travelled and amount of turn of imaging platform needed to capture the image 108.

Figure 3:
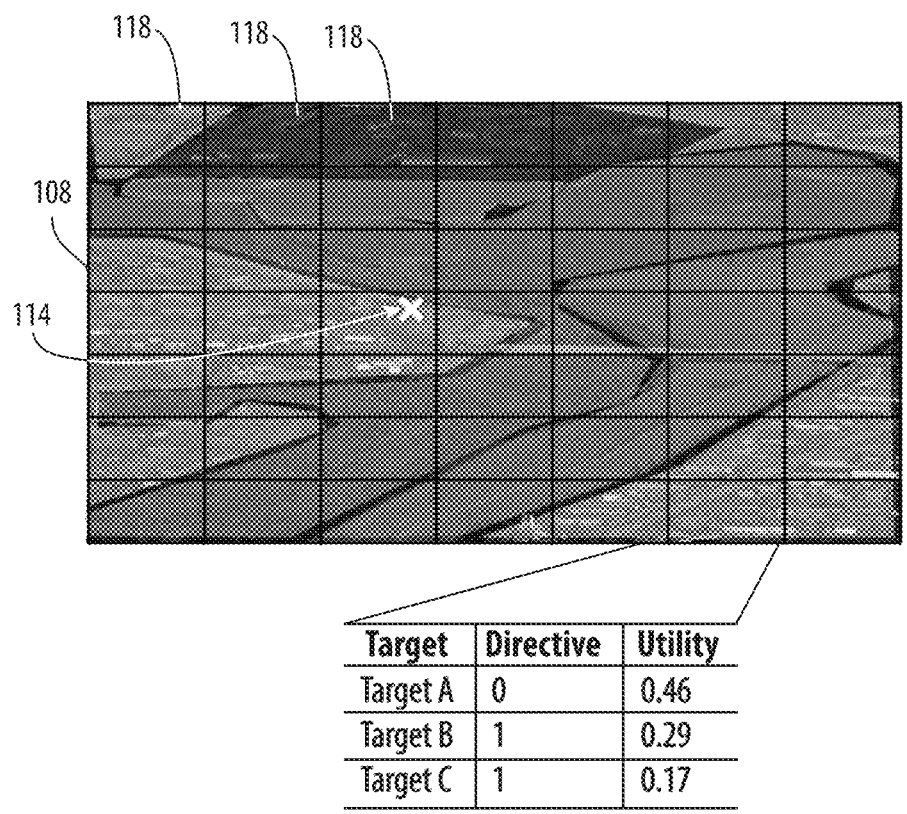
FIG. 3 is a schematic view of the image of FIG. 2, showing the image segmented into sub-images.

The mission plan value J can be determined by (land-target score)— (distance traveled)— (turn penalty), such that $$J(\theta)=\lambda_s \Sigma_i \Sigma_j d_i a_{ij} - \lambda_d \|a_j^{max} - a_j^{max}\|^2 - \lambda_t \alpha \quad (1)$$

where λ terms indicate a weight, d indicates the directive priority of each target, α is some turning function specific to the platform 102, and $a_{i,j}$ only contributes to the score/utility once per j value, regardless of how many times it is included or how much target utility it provides (see, for example, table in FIG. 3). The parameters of mission plan are represented by θ.

If the weight of one or more instances of the land-type associated with the target 114 is above a threshold, the method includes directing the physical resource 112 (e.g. the imaging platform 102 obtaining the downward looking images 108) to move toward one or more of these land-type instances associated with target 114. In this manner, the land use types can be leveraged for mission planning by directing the imaging device only to areas which will take the least amount of resources while retaining a high likelihood of imaging the target. For example, a captured image 108 may detect a land type with a low likelihood of containing the desired target 114, resulting in a low weight and require a large physical travel and high turn penalty for the imaging device. In that case, the physical resource 112 will not be guided to that land type. On the other hand, a high weight can be if the captured image detects a land type with a high likelihood of containing the desired target, and the imaging platform 102 requires little to no physical travel or turn. In this case, the physical resource 112 will be guided to this land type for further image capture. Thus, the mission is optimized by avoiding areas with a low weight, and only focusing on those with high weight and relevant to the mission.

In another aspect, the captured images can be prioritized for further analysis by expectation of finding the desired target 114 in the given land type. Using the lookup table described above, the controller 106 is able to determine what land type each target was located on. Once the relative frequency of each target on each land type is generated, the look up table can be applied in reverse and mapped back to physical locations. The resulting map is a 3-D matrix extending in 2 spatial dimensions (x,y) and one target dimension, creating a relative score of that land type for each target (where the score can be the same for each target on the same land types), the score based on the observed frequency of a target being present on that land type. Summing over the target scores each (x,y) location gives the utility of that square.

For example, as shown in FIG. 3, analyzing the captured image 108 includes dividing the image 108 into a grid of sub-images 116 (e.g. a size convenient for the specific image controller 106 used). For each sub-image, a product of each type of land and its size within the sub-image are summed to obtain a score, the score being representative of a likelihood of finding a target 114 in each land type in the images 108, based on a priori observations. Each square 116 has a composite utility $u_j=\Sigma_i a_i s_{ij}$, where a is the relative area of the land type and s is the score for that land type. The value and/or scores for each land type can be summed with respect to the target 114. The score can be specific to the target 114 and theater (e.g. land vehicles in the dessert may remain on roads, while the same land vehicles in mountainous regions may be commonly observed on sandy areas.)

Once a score is obtained, the method includes sorting the sub-images 116 into a queue by score so the image controller 106 can analyze the sub-images 116 to identify instances of the target 114. Using the score, analyzing the sub-images 116 can then be performed in order starting with a sub-image of highest score in the queue down to sub-images with lowest score. In certain such embodiments, sorting new imagery into the queue and analyzing some of the new imagery before completing analysis of all original sub-images 116 in the queue. In certain embodiments, a latency term can also be added so that as new imagery becomes available it is prioritized (e.g. over similar but older imagery), allowing for real time, online prioritizing of captured images 108.

As the images 108 are prioritized and analyzed, and the target 114 identified, the method can include providing output to a user showing identity and/or location of the target, for example for aiding in guiding a physical resource 112 or other mission planning items based on the identity and/or location of the target 114.

In certain embodiments, the method can then include directing the physical resource 112 to move physically toward the identified target 114 (e.g. to gather more images, or any other suitable purpose for the mission at hand). In embodiments, the physical resource 114 can include, but is not limited to, guided munitions, further imaging assets, additional services (e.g. including object detection algorithms), or the like. For example, execution commands can be sent to computing device to guide the physical resource in any suitable manner based on the particular land type captured.

The methods and systems of the present disclosure, as described above and shown in the drawings, provide for improved effectiveness of mission planning by focusing on areas where targets are commonly found, and prioritized imagery that overlaps with areas where targets are commonly found. Tailoring the target lookup table (B) to each theater of operation to dynamically assesses how targets are deployed differently, or when new targets or target variants are observed. Additionally, the systems and methods provided herein are improve speed and efficiency of image capture and processing by using ubiquitous land cover maps which are already high resolution and easily accessible and by loading only the NITF header rather than the entire image data. While the apparatus and methods of the subject disclosure have been shown and described, those skilled in the art will readily appreciate that changes and/or modifications may be made thereto without departing from the scope of the subject disclosure.

What is claimed is:

1. A method comprising:
   obtaining downward looking images of an area;
   determining land types indicated in the images;
   screening the images based on the land types wherein screened images pass screening based on land type more likely to include a target;
   dividing each screened image into a grid of sub-images;
   analyzing only the sub-images that include one or more land types likely to include the target, and foregoing analysis of other sub-images;
   determining a weight for each sub-image based on a land-target score, a distance traveled, and a turn penalty; and
   directing a physical resource to move toward one or more potential instances of the target if the weight of the one or more potential instances of the target is above a threshold;
   obtaining one or more additional downward looking images; and
   identifying the target in one of the one or more additional images.

2. The method as recited in claim 1, wherein identifying the target includes identifying multiple instances of one type of target in one or more of the images.

3. The method as recited in claim 1, wherein identifying includes providing output to a user showing identity and/or location of the target.

4. The method as recited in claim 1, wherein the land types include dry ground and bodies of water.

5. The method as recited in claim 1, wherein screening includes for each image, grouping pixels of like-land types into groups, one group for each land type in the image.

6. The method as recited in claim 5, wherein grouping pixels of like-land types includes grouping pixels by identical land type.

7. The method as recited in claim 5, wherein grouping pixels of like-land types includes grouping pixels in hierarchical land types.

8. The method as recited in claim 1, where screening includes using a look up table identifying likelihood of finding a target in each land type in the images.

9. The method as recited in claim 1, further comprising only analyzing images in the area that are within a region of interest (ROI).

10. The method as recited in claim 1, wherein the physical resource is an imaging platform, wherein obtaining the downward looking images of the area is performed by the imaging platform.

11. The method as recited in claim 1, wherein analyzing includes:
dividing an image into a grid of sub-images;
for each sub-image, summing a product of each land type and its size within the sub-image to obtain a score, the score being representative of a likelihood of finding a target in each land type in the images;
sorting the sub-images into a queue by score; and
analyzing the sub-images to identify instances of a target, wherein analyzing is performed in order starting with a sub-image of highest score in the queue down to sub-images with lowest score.

12. The method as recited in claim 11, further comprising sorting new imagery into the queue and analyzing some of the new imagery before completing analysis of all original sub-images in the queue.

13. An imaging system comprising:
an imaging platform;
a camera operatively connected to the imaging platform; and
a controller operatively connected to control the imaging platform and the camera, wherein the controller includes machine readable instructions configured to cause the controller to perform a method, the method comprising:
obtaining downward looking images of an area;
determining land types indicated in the images;
screening the images based on the land types wherein screened images pass screening based on land type more likely to include a target;
dividing the image in which the target is identified into a grid of sub-images;
analyzing only the sub-images that include one or more land types likely to include the target, and foregoing analysis of other sub-images;
determining a weight for each instance of the target identified based on a land-target score, a distance traveled, and a turn penalty;
directing a physical resource to move toward one or more instances of the target if the weight of one or more instances of the target is above a threshold;
obtaining one or more additional downward looking images; and
identifying the target in one of the images.

14. The imaging system as recited in claim 13, wherein screening includes:
for each image, grouping pixels of like-land types into groups, one group for each land type in the image, wherein grouping pixels of like-land types includes at least one of: grouping pixels by identical land type and/or grouping pixels of like-land types includes grouping pixels in hierarchical land types; and
using a look up table identifying likelihood of finding a target in each land type in the images.

15. The imaging system as recited in claim 14, wherein the method further includes:
only analyzing images in the area that are within a region of interest (ROI).

16. The imaging system as recited in claim 13, wherein analyzing includes:
dividing an image into a grid of sub-images;
for each sub-image, summing a product of each type of land and its size within the sub-image to obtain a score, the score being representative of a likelihood of finding a target in each land type in the images;
sorting the sub-images into a queue by score; and
analyzing the sub-images to identify instances of a target, wherein analyzing is performed in order starting with a sub-image of highest score in the queue down to sub-images with lowest score.

17. The imaging system as recited in claim 16, further comprising sorting new imagery into the queue and analyzing some of the new imagery before completing analysis of all original sub-images in the queue.

18. A method comprising:
determining a target to be found in an area;
obtaining downward looking images of the area;
determining land types indicated in the images;
screening the images based on the land types wherein screened images pass screening based on land type more likely to include the predetermined target;
analyzing only portions the screened images that include one or more land types likely to include the predetermined target, and foregoing analysis of portions of the images that do not include the one or more land types likely to include the predetermined target;
identifying the target in one of the images; and
directing a physical asset to move physically toward the target.

* * * * *